US010563794B2

(12) United States Patent
Subacchi

(10) Patent No.: US 10,563,794 B2
(45) Date of Patent: Feb. 18, 2020

(54) REINFORCED CONCRETE PIPE

(71) Applicant: Hawkeye Concrete Products Co., Mediapolis, IA (US)

(72) Inventor: Claudio Subacchi, Mediapolis, IA (US)

(73) Assignee: FSC Technologies, LLC, Orlando, FL (US)

(*) Notice: Subject to any disclaimer, the term of this patent is extended or adjusted under 35 U.S.C. 154(b) by 135 days.

(21) Appl. No.: 14/708,407

(22) Filed: May 11, 2015

(65) Prior Publication Data
US 2015/0323104 A1 Nov. 12, 2015

Related U.S. Application Data

(60) Provisional application No. 61/991,694, filed on May 12, 2014.

(51) Int. Cl.
F16L 9/08 (2006.01)
F16L 15/00 (2006.01)
(Continued)

(52) U.S. Cl.
CPC ............ F16L 9/085 (2013.01); B23P 19/00 (2013.01); F16L 15/00 (2013.01);
(Continued)

(58) Field of Classification Search
CPC ... F16L 15/00; F16L 25/0027; F16L 58/1009; F16L 58/1063
(Continued)

(56) References Cited

U.S. PATENT DOCUMENTS 912,318 A * 2/1909 McMahon ............ F16L 13/113
138/175
2,234,643 A * 3/1941 Grant .................. F16L 25/0027
285/290.1
(Continued)

FOREIGN PATENT DOCUMENTS

AU 465991 5/1973
AU 4556879 10/1980
(Continued)

OTHER PUBLICATIONS

International Search Report dated Jul. 17, 2015 for related International App. No. PCT/US2015/0030071.
(Continued)

Primary Examiner — Patrick M. Buechner
Assistant Examiner — Michael J. Melaragno
(74) Attorney, Agent, or Firm — Shuttleworth & Ingersoll, PLC; Jason Sytsma

(57) ABSTRACT

Structural body comprises a concrete core and a cap around the opening. A first wrap is wrapped under tension around the concrete core and a portion of the cap to form a continuous water resistant barrier around the outer surface of the concrete core. A second wrap can be wrapped under tension around the inner surface of concrete core to form a continuous water resistant barrier around the inner surface of the concrete core. Structural body can be formed as a pipe with a male and female ends to interconnect multiple pipes. The joint formed between two structural bodies has a continuous water resistant barrier that prevents the environment from contacting the concrete core.

4 Claims, 6 Drawing Sheets

(51) Int. Cl.
*F16L 58/10* (2006.01)
*F16L 25/00* (2006.01)
*B23P 19/00* (2006.01)

(52) U.S. Cl.
CPC ........ *F16L 25/0027* (2013.01); *F16L 58/1009* (2013.01); *F16L 58/1063* (2013.01); *Y10T 29/49828* (2015.01)

(58) Field of Classification Search
USPC ........................................................ 138/109
See application file for complete search history.

(56) References Cited

U.S. PATENT DOCUMENTS

| | | | | | |
|---|---|---|---|---|---|
| 2,378,593 | A | * | 6/1945 | Stuart | F16L 9/08 138/145 |
| 2,571,578 | A | * | 10/1951 | Janssens | F16L 25/0027 138/109 |
| 2,660,199 | A | * | 11/1953 | Montgomery | B28B 21/56 138/109 |
| 2,706,498 | A | * | 4/1955 | Upson | B28B 21/60 138/176 |
| 3,151,870 | A | * | 10/1964 | Lafferty | F16L 25/0027 277/626 |
| 3,217,077 | A | | 11/1965 | Cocke | |
| 3,289,704 | A | * | 12/1966 | Nicosia | B29C 44/1295 138/141 |
| 3,340,115 | A | | 9/1967 | Rubenstein | |
| 3,467,144 | A | * | 9/1969 | Cureton | B28B 21/60 138/176 |
| 3,502,356 | A | * | 3/1970 | Schmunk | F16L 21/022 138/109 |
| 3,503,636 | A | | 3/1970 | Bower et al. | |
| 3,578,036 | A | * | 5/1971 | Francois | B21F 27/127 138/109 |
| 3,630,237 | A | * | 12/1971 | Varnell | F16L 9/08 138/176 |
| 3,683,061 | A | * | 8/1972 | Gates | B28B 21/76 249/100 |
| 3,724,768 | A | * | 4/1973 | Breitfuss | B28B 21/64 242/437 |
| 3,758,940 | A | * | 9/1973 | Lamy | B28B 21/56 264/228 |
| 3,858,912 | A | | 1/1975 | Bower | |
| 3,871,410 | A | * | 3/1975 | Francois | F16L 9/08 138/175 |
| 3,950,465 | A | * | 4/1976 | Farahar | B28B 21/56 138/175 |
| 3,964,521 | A | * | 6/1976 | Kao | B28B 21/64 138/176 |
| 4,113,823 | A | * | 9/1978 | Iida | B28B 21/30 138/176 |
| 4,662,655 | A | * | 5/1987 | Fliervoet | F16L 47/02 285/133.3 |
| 4,676,276 | A | * | 6/1987 | Fawley | F16L 57/00 138/172 |
| 4,982,549 | A | * | 1/1991 | Beck | E04B 1/215 405/231 |
| 5,043,033 | A | * | 8/1991 | Fyfe | B29C 70/56 156/71 |
| 5,573,040 | A | * | 11/1996 | Schumacher | B28B 19/0023 138/144 |
| 5,607,527 | A | * | 3/1997 | Isley, Jr. | E04C 3/34 156/71 |
| 5,676,330 | A | * | 10/1997 | Zhu | B65H 81/08 220/588 |
| 6,219,991 | B1 | * | 4/2001 | Salek-Nejad | E04C 3/34 156/172 |
| 6,247,279 | B1 | * | 6/2001 | Murat | E04C 3/34 52/223.3 |
| 7,267,507 | B2 | * | 9/2007 | Lecinq | F16L 9/153 138/97 |
| 7,478,650 | B2 | * | 1/2009 | Pleydon | B29D 23/001 138/125 |
| 2003/0178079 | A1 | * | 9/2003 | Friedrich | E03F 3/04 138/109 |
| 2004/0071910 | A1 | * | 4/2004 | Guidi | F16L 9/085 428/36.9 |
| 2005/0189763 | A1 | * | 9/2005 | Fasel | F16L 9/08 285/230 |
| 2006/0060286 | A1 | * | 3/2006 | Fyfe | E04G 23/0218 156/94 |
| 2006/0186662 | A1 | * | 8/2006 | Andrick | B28B 21/563 285/230 |
| 2008/0155827 | A1 | * | 7/2008 | Fyfe | E04G 23/0218 29/897.1 |
| 2008/0257445 | A1 | * | 10/2008 | Subacchi | B21F 27/124 140/113 |
| 2009/0272453 | A1 | * | 11/2009 | Schlecht | B65G 53/32 138/109 |
| 2011/0108151 | A1 | * | 5/2011 | Lee | B28B 21/56 138/175 |
| 2012/0204499 | A1 | * | 8/2012 | Brandstrom | E04G 21/142 52/125.4 |
| 2014/0331580 | A1 | * | 11/2014 | Subacchi | E04C 5/08 52/223.14 |
| 2015/0059911 | A1 | * | 3/2015 | Petrov | F16L 13/02 138/172 |
| 2015/0323104 | A1 | * | 11/2015 | Subacchi | F16L 58/1009 138/109 |
| 2015/0330535 | A1 | * | 11/2015 | Subacchi | F16L 9/08 138/122 |

FOREIGN PATENT DOCUMENTS

| | | |
|---|---|---|
| DE | 19801019 A1 | 7/1999 |
| DE | 10215059 | 2/2002 |
| DE | 202012004630 | 8/2013 |
| RU | 2432515 C2 | 10/2011 |
| RU | 116955 U1 | 6/2012 |
| SU | 936663 A1 | 9/1987 |

OTHER PUBLICATIONS

Russian Office Action dated Mar. 6, 2018 for counterpart Russian Patent Application No. 2016144195.
Office Action issued by the European Patent Office dated Jul. 4, 2018 for counterpart European Patent Application No. 15 722 912.1.
Office Action issued by the Indian Patent Office dated Aug. 5, 2019 for counterpart Indian Patent Application No. 201617037502.

* cited by examiner

REINFORCED CONCRETE PIPE

This application claims priority to U.S. Provisional Application No. 61/991,694 filed May 12, 2014, the entirety of which is hereby incorporated by reference herein.

This invention relates to pipe, tanks and vessels, and methods of making the same, and more specifically to a pipe, tanks and vessels with a water resistant barrier.

BACKGROUND

Concrete bodies, such as pipes, vessels, tanks, and the like are susceptible to corrosion either from the exterior or interior environment. To combat this problem, liners of highly plasticized PVC were created to be cast into the inside diameter of the concrete core to provide corrosion protection. These liners were successful in providing corrosion protection; however, they had other problems. When connecting multiple bodies, such as pipes, the joint area between pipe sections needs to be sealed, typically by having a person weld a protective strip over the joint once the pipe sections are installed. The result of the production problems and the field welding made this system expensive and limited the size range to those accessible to man entry. An improved reinforced concrete pipe that can effectively seal the concrete core from the environment is needed.

SUMMARY

A structural body is disclosed. The structural body comprises a concrete core and a cap around the opening. A first wrap is wrapped under tension around the concrete core and a portion of the cap to form a continuous water resistant barrier around the outer surface of the concrete core. A second wrap can be wrapped under tension around the inner surface of concrete core to form a continuous water resistant barrier around the inner surface of the concrete core. Structural body can be formed as a pipe with a male and female ends to interconnect multiple pipes. The joint formed between two structural bodies has a continuous water resistant barrier that prevents the environment from contacting the concrete core.

DETAILED DESCRIPTION

Figure 1:
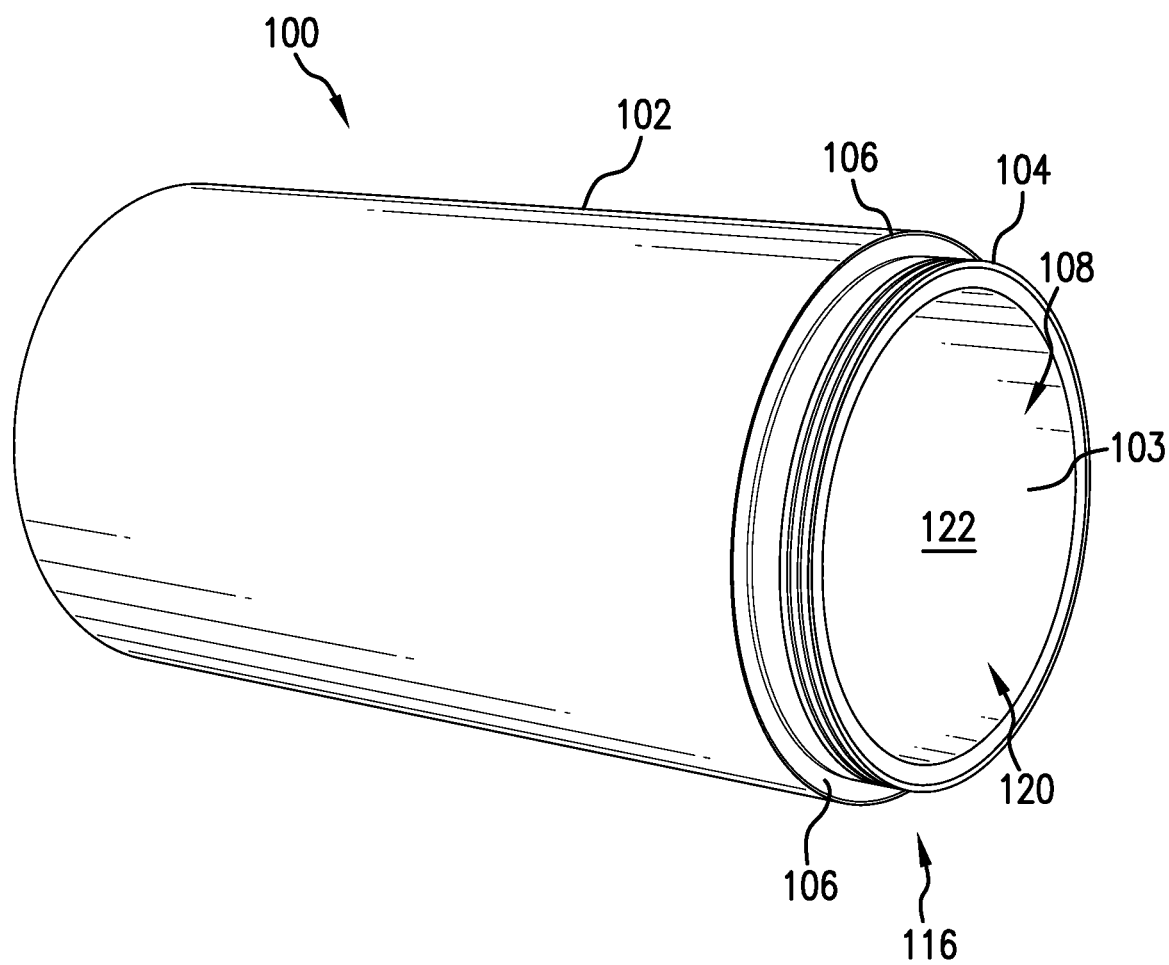
FIG. 1 shows a perspective view of a male end of a pipe according to an embodiment of this disclosure.

Disclosed is a high-strength structural body and method of making the same. Structural body can take the form of a pipe, tank, vessel of some other shape with at least one opening 108 that needs to be sealed. The illustrated embodiment is a pipe 100. Pipe 100 comprises a concrete core 104 (shown in FIG. 2) that is fitted at its opening with a cap 106 and surround with a wrap 102 to form a water resistant barrier around concrete core 104. Pipe 100 has a male end 116 (FIG. 2) and female end 118 (FIG. 4), which allows two pipes 100 can be connected male-to-female end to form a joint with a continuous water resistant barrier between concrete core 104 and the environment.

Figure 2:
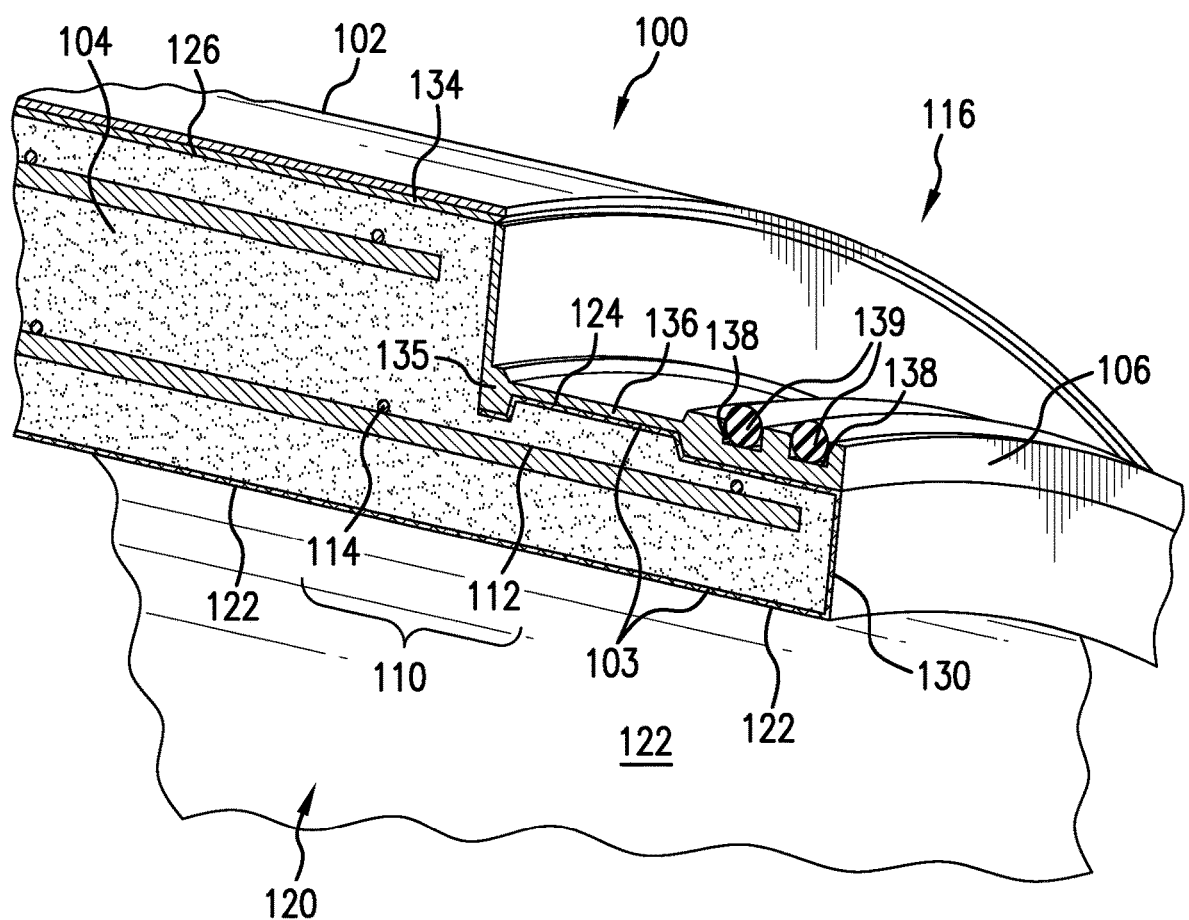
FIG. 2 shows a close-up view of the male end of the pipe of FIG. 1.
Figure 3:
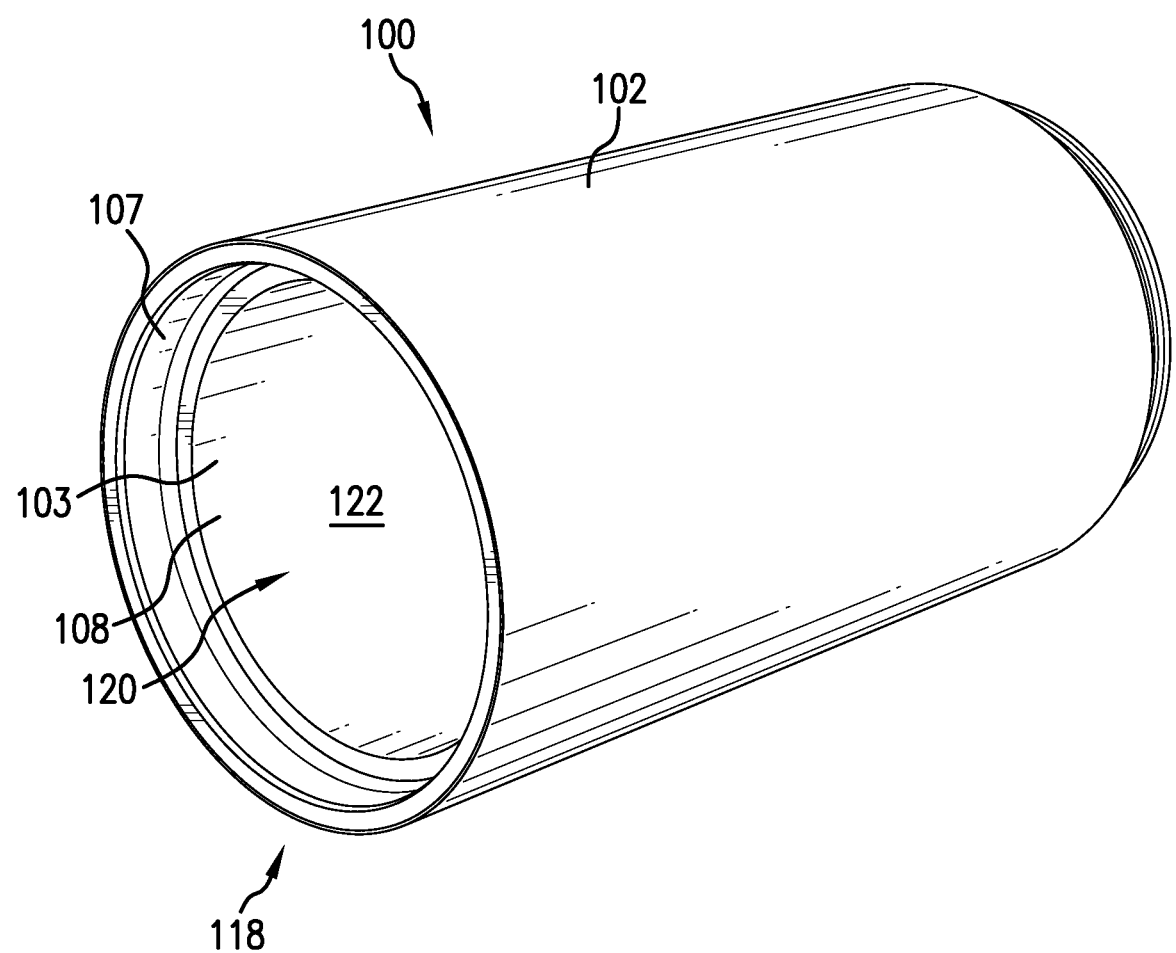
FIG. 3 shows a perspective view of a female end of the pipe of FIG. 1.

Turning to FIG. 2, concrete core 104 can be cast around a cage 110 that can include one or more longitudinal rods 112 and one or more steel wires 114. Steel wire 114 is spirally wrapped around longitudinal rods 112. Wet concrete is then cast around a cage 110 to form concrete core 104. Alternative embodiments include other shapes of steel reinforcement or steel or a high tensile strength material with an elasticity modulus greater than or equal to the concrete in concrete core 104, such as fibers made from steel, plastic, etc. Such reinforcement counteracts the stress from wrap 102 that may cause, do to the Poisson coefficient, concrete core 104 to elongate in a direction perpendicular to the applied load of wrap 102 and crack.

Concrete core 104 is fitted at its opening 108 with a cap 106. In the illustrated embodiment, cap 106 is positioned around male end 116 of concrete core 104, and another cap 107 is positioned in female end 118 of concrete core 104. Cap 106, as shown in FIG. 2, has an outer sleeve 134 that surrounds a portion of outer surface 126 of concrete core 104 and an inner sleeve 136 that surrounds outer diameter 124 of male end 116 of concrete core 104. Cap 106 can include one or more protrusions 135 corresponding with a depression in concrete core 104 to mechanically lock cap 106 to concrete core 104. Protrusions 135 can be on outer sleeve 134 or inner sleeve 136. At least one groove 138 is at the end of inner sleeve 136 for receiving a sealing ring(s) 139.

Figure 4:
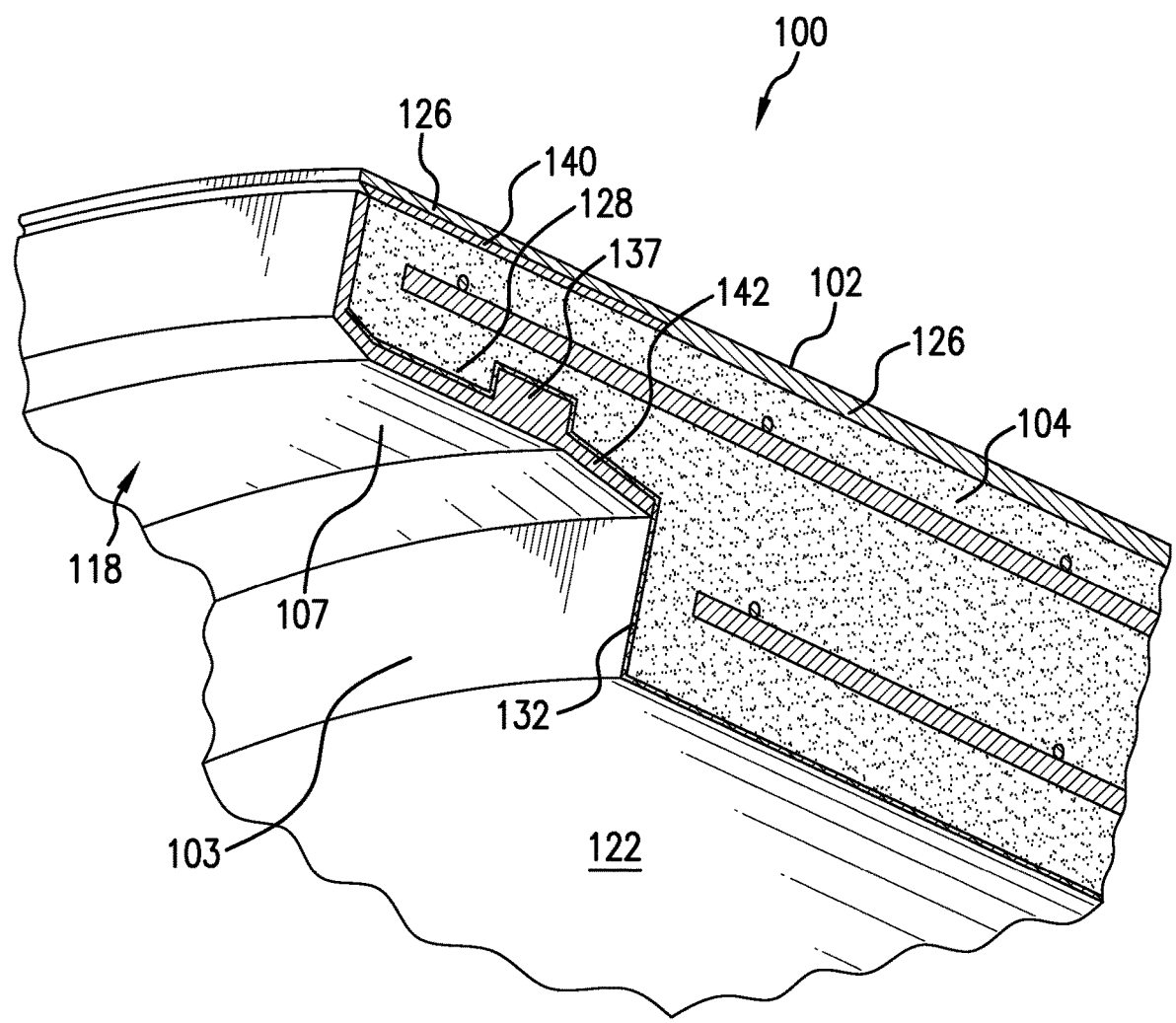
FIG. 4 shows a close-up view of the female end of the pipe of FIG. 3.

Cap 107, as shown in FIG. 4, has an outer sleeve 140 that surrounds a portion of outer surface 126 of concrete core 104 and an inner sleeve 142 that surrounds inner diameter 128 of female end 118 of concrete core 104. Cap 107 can include one or more protrusions 137 corresponding with a depression(s) in concrete core 104 to mechanically lock cap 107 to concrete core 104. Cap 106 and cap 107 can be made from steel, a low permeable polymer, or any other material capable of providing a water-resistant barrier to concrete core 104.

Cap 106, cap 107, and outer surface 126 of concrete core 104 can be wrapped with wrap 102. Wrap 102 can extend the length of outer surface 126 and cover outer sleeve 134 of cap 106 and outer sleeve 140 of cap 107. Wrap 102 forms a continuous water resistant barrier around concrete core 104. When wrap 102 is combined with cap 106 and cap 107 a continuous water resistant barrier is formed that can seal concrete core 104, and thus, interior area 120, from the external environment. To the extent that any moisture seeps into the joints formed between male end 116 of pipe 100 and female end 118 of another pipe 100 sealing rings 139 positioned in grooves 138 would block the moisture from seeping beyond the sealing rings 139 and into interior area 120.

Inner surface 122 of concrete core 104 can be wrapped with a wrap 103. With respect to male end 116, shown in FIG. 2, wrap 103 can extend the length of inner surface 122 of concrete core 104 and up sealing face 130 of male end 116 and around outer diameter 124 of male end 116. With respect to female end 118, as shown in FIG. 4, wrap 103 can extend up sealing face 132 and around inner diameter 128 of female end 118. Wrap 103 forms a continuous water resistant barrier around inner surface 122 of concrete core 104.

When wrap 103 is combined with cap 106 and cap 107 a continuous water resistant barrier is formed that can seal the concrete in concrete core liquid in interior area 120. To the extent that any moisture seeps into the joints formed between male end 116 of pipe 100 and female end 118 of another pipe 100 sealing rings 139 positioned in groove 138 would block the moisture from seeping beyond sealing rings 139 and into the outer environment.

Wrap 102 and wrap 103 can be spirally wrapped under controlled tension to apply a radial compression on concrete core 104 to enable concrete core 104 to handle a higher internal pressure or external pressure, respectively. Wrap 102 and wrap 103 can be made of a fiberglass cloth wrap, a polymer wrap, or any other material capable of providing a water-resistant barrier to concrete core 104. Wrap 102 and wrap 103 also counters the effect of the Poisson deformation that may generate axial tension in concrete core 104.

Figure 5:
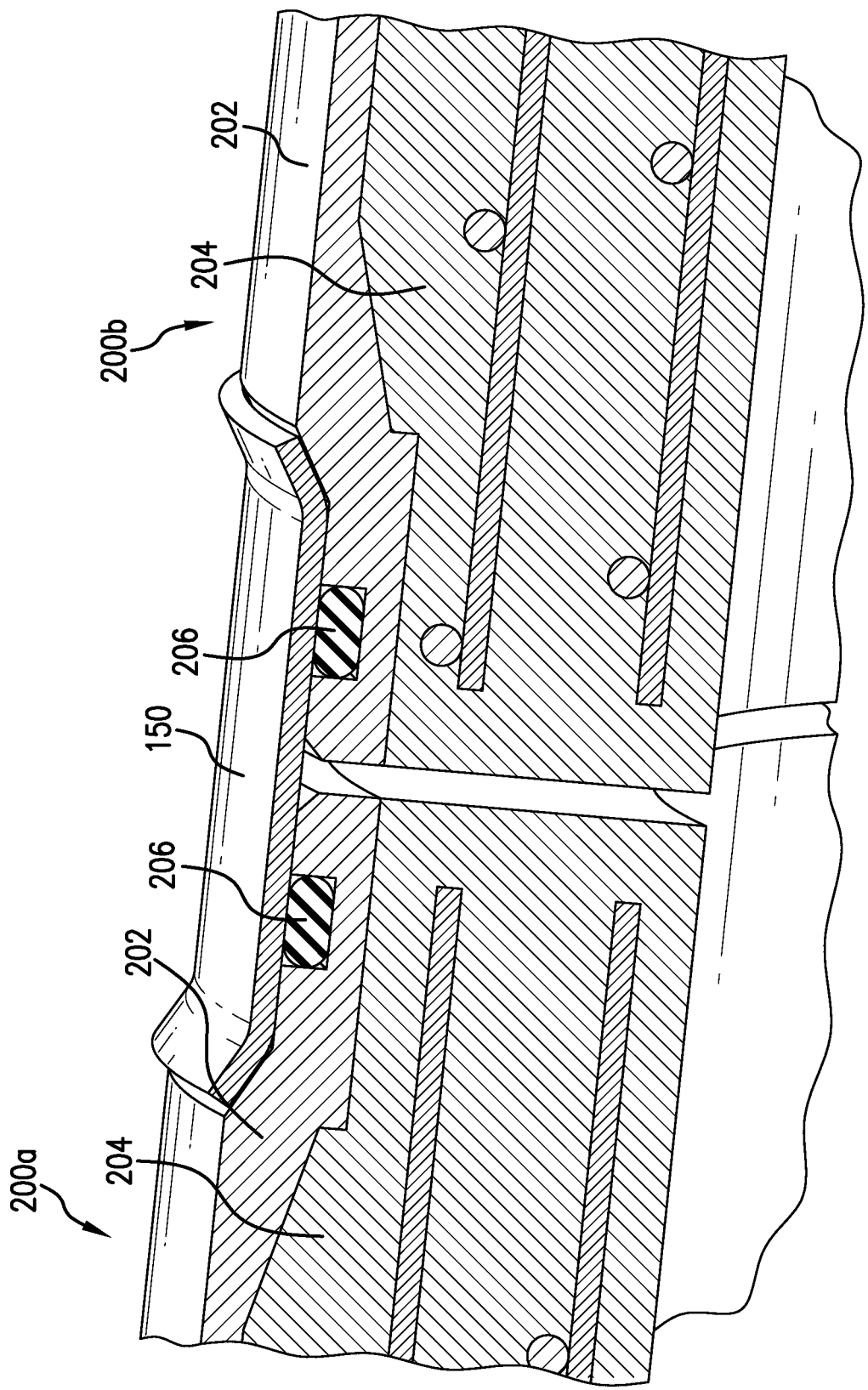
FIG. 5 shows a close-up sectional view of a joint connecting two pipes according to another embodiment of this disclosure.

FIG. 5 shows an alternative design for connecting two pipes 202a and 202b when an axial restraint is not required (i.e., there's not an external force trying to separate each pipe 202a and 202b). In this configuration, a concrete core 204 is spirally wrapped under stress with a pre impregnated wrap 202 to pre-stress concrete core 204 to restrain radial expansion of concrete core. Wrap 202 similarly provides a water-resistant barrier to external the environment or a continuous water barrier from the contents inside pipe 202a, 202b. A groove is machined in each wrap 202 to receive a seal 206. Pipes 200a and 200b are joined together by a collar 150. When each pipe 202a and 202b are combined together, a water-resistant barrier to concrete core 204 is formed.

Figure 6:
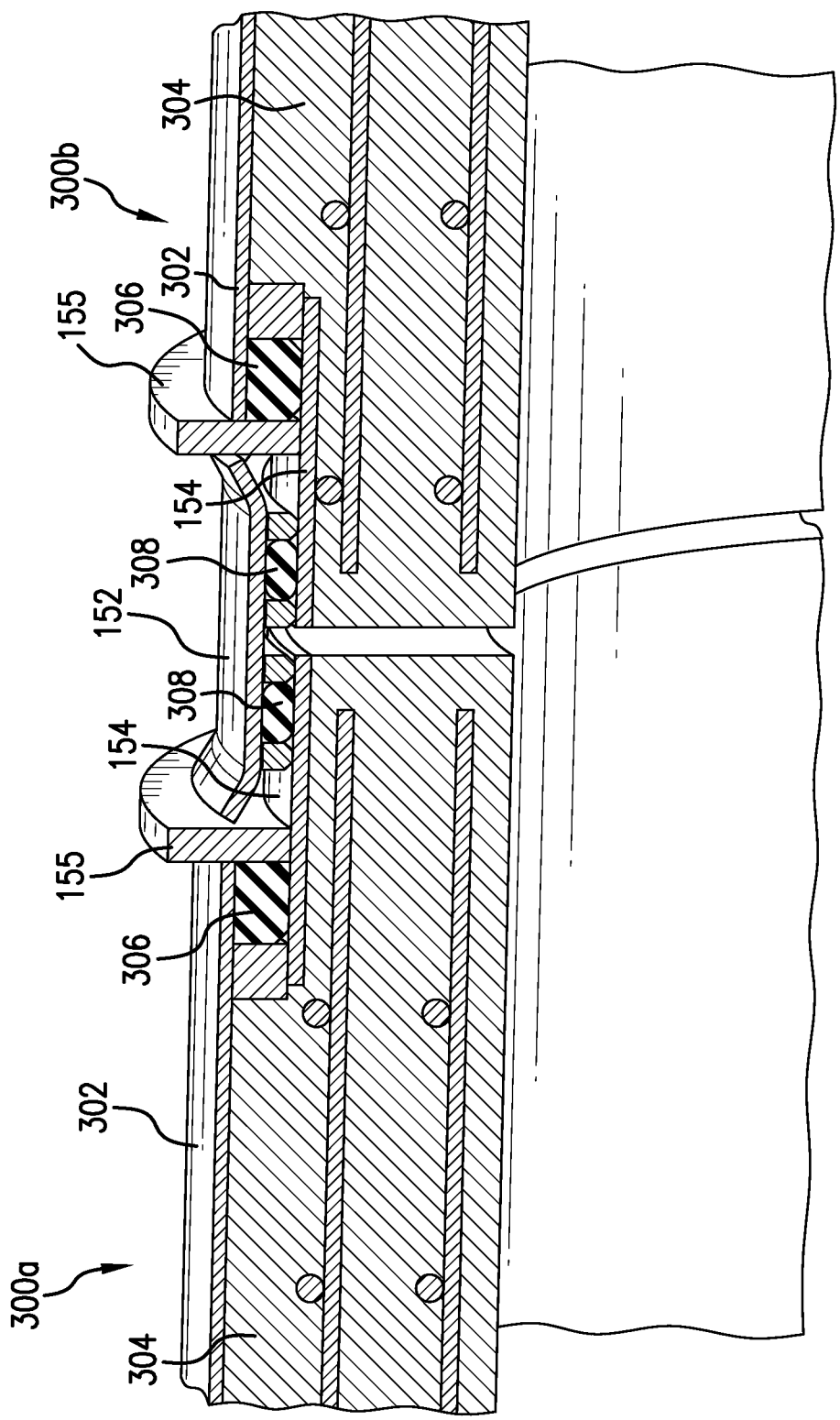
FIG. 6 shows a close-up sectional view of a joint connecting two pipes according to another embodiment of this disclosure.

FIG. 6 is an example of joining two pipes 300a and 300b together when axial restraint is necessary. Each pipe 300a and 300b is fitted with a collar portion 154. A vertical flange 155 is welded or fixed in some manner to each collar portion 154. Each pipe 300a and 300b is spirally wrapped under stress with a pre-impregnated fiber that for wrap 302 to pre-stress concrete core 304 to restrain axial expansion of concrete core 304. When each pipe 300a and 300b are brought together, a ring 152 is welded, bolted, or attached in some other manner to each vertical flange 155 of each collar portion 154. Spaces can be formed to receive one or more seals 306 and 308. When each pipe 302a and 302b are combined together, a water-resistant barrier to and from concrete core 304 is formed and pipe 302a and 302b are axially restrained so that they cannot be separated by an external force.

While the present invention has been particularly shown and described with reference to exemplary embodiments thereof, it should be understood by those of ordinary skill in the art that various changes, substitutions and alterations can be made herein without departing from the scope of the invention as defined by appended claims and their equivalents.

What is claimed is:

1. A method of making a structural body comprising:
forming a concrete core having an outer surface and an opening to an interior surface:
fitting a first cap having an outer sleeve that extends partially on the outer surface of the concrete core and around the opening to the interior surface of the concrete core; and
applying under tendon a first wrap around the concrete core while the concrete core is in an unloaded state and at least partially around the outer sleeve of the first cap so that the first wrap is in a state of tension and applying radial compression on the concrete core.

2. The method of claim 1, and further comprising: forming the concrete core with a male end and a female end and fitting the first cap on the male end around the opening and fitting a second cap on the female end around a second opening and applying the first wrap around a portion of the first cap around the concrete core and a portion of the second cap.

3. The method of claim 2, applying under tension a second wrap around a portion of the male end and around the interior surface of the concrete core and around a portion of the female end.

4. The method of claim 3, and further comprising mechanically locking the first cap to the concrete core with a first cooperating protrusion and depression and mechanically locking the second cap to the concrete core with a second cooperating protrusion and depression.

* * * * *